Sept. 27, 1932.  McDONALD LOVELL ET AL  1,879,368
FREEZING TRAY FOR REFRIGERATORS
Filed June 28, 1930

Inventors:
McDonald Lovell,
Victor Sussin,
By
Attys.

Patented Sept. 27, 1932

1,879,368

UNITED STATES PATENT OFFICE

McDONALD LOVELL AND VICTOR SUSSIN, OF CHICAGO, ILLINOIS

FREEZING TRAY FOR REFRIGERATORS

Application filed June 28, 1930. Serial No. 464,572.

This invention relates to a freezing tray or mould appropriate for use in domestic refrigerators, or otherwise, for the freezing of ice blocks or the like.

In domestic or other small type refrigerators in which the cooling is accomplished directly by the expansion of the refrigerant in appropriate heat absorbing coils, it is customary to provide trays or moulds of some sort which may be conveniently positioned with respect to the coils, for the purpose of freezing water to provide ice for various uses, or for the purpose of freezing ice cream or the like. While several of such devices now in use operate effectively in the freezing of the contained liquid, the extraction of the frozen blocks from the mould or tray is a matter of considerable difficulty and inconvenience and usually is more or less wasteful of the frozen material.

One object of the present invention is the provision of a mould or tray suitable for such use and which may be utilized with convenience and facility in charging and discharging, and which will also contribute to the rapidity with which its contents may be frozen.

Another object is the provision of such a device which may be employed with facility in such use without involving undue wastage or loss of the frozen contents.

Still another object is the provision of such a device which is easily cleaned and kept clean, and which is of simple construction such as to permit its being supplied at low cost, and of substantial nature such as qualifies it for the intended uses.

Other and further objects will be pointed out or indicated hereinafter or will become apparent upon use of the invention.

In the accompanying drawing and in the following specification we show and describe certain forms in which the invention may be embodied, but it is to be understood that these are presented by way of example or illustration only, and are not to be construed in any fashion calculated to limit the appended claims short of the true and most comprehensive scope of the invention in the art.

In said drawing.

Figure 1:
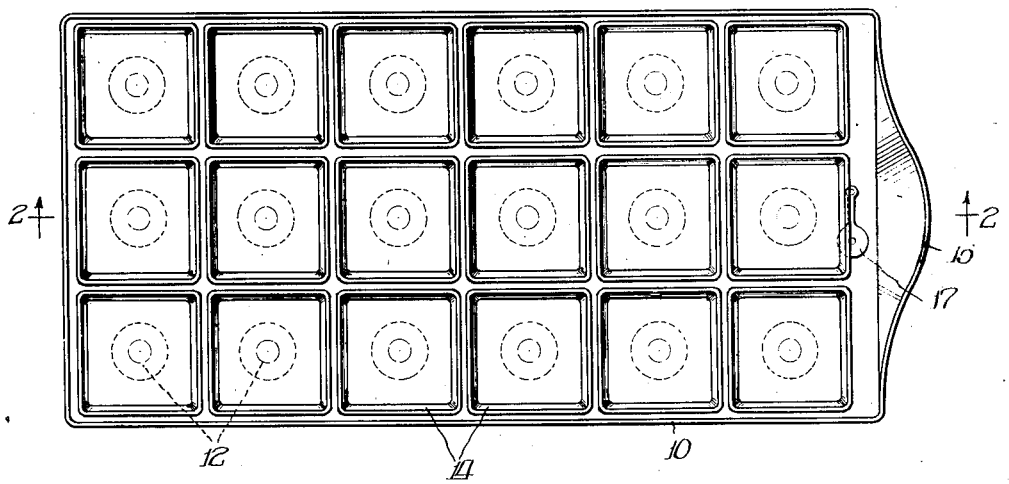
Fig. 1 is a plan or top view of one embodiment of the invention.
Figure 2:
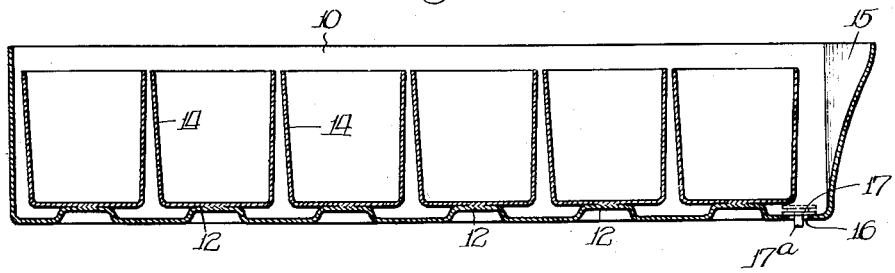
Fig. 2 is a longitudinal sectional elevation of same.

The nature of the invention will be quickly ascertained from the examples here shown. The embodiment illustrated in Figs. 1 and 2 comprises a tray or external receptacle 10 of appropriate contour having side and end walls and a bottom formed with uniformly spaced and distributed upwardly embossed portions 12. Upon these are supported individually the block moulds or receptacles 14, in the nature of small cups of appropriate form and size, the disposal of same being such that their side walls are spaced apart from one another and from the walls of the receptacle 10, and their bottom portions are also spaced apart from the bottom of the container excepting where in contact with the embossments 12. The containers may be secured to these embossments by spot welding or in other appropriate fashion. The height of the containers 14, when thus disposed in the receptacle, is preferably, though not necessarily, such that their top rims are slightly below the upper rim of the receptacle walls. The receptacle and the containers preferably are formed of a suitable rigid sheet material of good heat conducting quality, such as sheet metal, preferably of a non-corrosive character, such as aluminum or Monel metal. The form of the containers preferably is such that they have a slight draw or downward taper.

At an appropriate point, preferably at one end, a wall of the receptacle may be flared outwardly, as indicated at 15, or otherwise arranged so as to afford a filling space clear of the containers, and at an appropriate location in the bottom of the receptacle is formed a drainage opening 16, which may be closed by a simple valve 17, susceptible of being manipulated by hand to unstop the drainage opening.

In the use of the device, for the freezing of water for example, the containers 14 may be filled to the brim by filling the receptacle 10 with water. Then the space in the receptacle outside the containers may be drained of water by opening the valve 17, as by pressing it up by hand or by resting it on the sink in such fashion that the valve plunger 17ᵃ will be pressed upwardly to unseat the valve. The receptacle thus being drained of water, the containers are left filled, and the tray may be placed in the refrigerator in order to accomplish the freezing of the water in the containers. It will be observed that in the arrangement shown all of the walls of the individual containers are exposed to the circulation of the refrigerating air, the freezing thus being expedited by the large heat exchange surface afforded between the respective bodies of water and the refrigerating air. When the water is frozen, in order to remove the frozen blocks from the containers, the tray may be removed from the refrigerator and warm water placed in the receptacle, as by running it into the space afforded by the form of the portion 15, until the receptacle is filled up to adjacent the tops of the containers. The warm water will produce a slight thawing along the surfaces of contact of the ice blocks and the containers such as to free the blocks, whereupon the warm water may be immediately drained out through the drainage opening, and the tray then inverted over a suitable receptacle so that the ice blocks will all be immediately discharged into the latter. It will be observed that in this thawing operation, the respective containers are subjected uniformly to the heating so that all of the blocks will be freed, and that this will be accomplished very quickly so that there will not be appreciable loss of the frozen material through superfluous thawing of some in obtaining a thawing requisite to free others.

Figure 3:
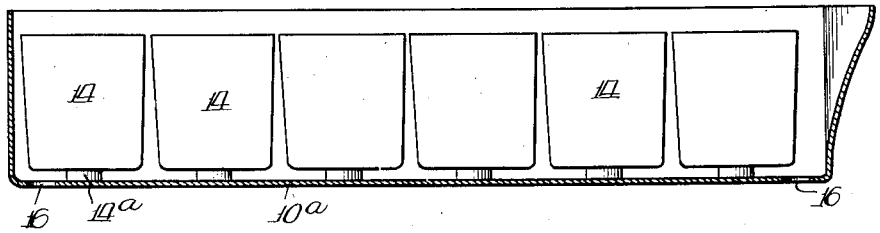
Fig. 3 is a similar longitudinal sectional elevation of a modified form.

In the modified construction shown in Fig. 3, the bottom of the receptacle, which is designated 10ᵃ in this instance, is flat, and the containers 14 are spaced from the same by suitable washers or spacers 14ᵃ, said spacers being secured to the containers and the bottom of the receptacle by spot welding or in other appropriate fashion. Here too the bottoms of the containers are spaced from the bottom of the receptacle, and the walls of the containers spaced from one another, thus affording channels for the free circulation of the refrigerating air practically entirely about the contents of the respective containers, as well as permitting the uniform application of the thawing fluid to the walls of the latter. In this example the receptacle is provided with drainage openings 16, so disposed that they may be conveniently closed by the fingers of the user when the tray is held in the hands. With the drainage openings thus closed, the receptacle may be filled with water to fill the containers, and upon removal of the fingers from the openings, the water will quickly drain out, leaving the containers filled. Likewise in the freeing operation, the openings 16 may be similarly closed by the fingers while the warm water is being run into the receptacle, and the warm water drained out quickly when the openings are unstopped. The drainage opening or openings may be so proportioned that the rate of discharge therethrough may permit the water to be run in to fill the receptacle rapidly while the openings are unstopped.

The device is qualified for the freezing of ice cream or like substances, but in such use the containers 14 will be filled individually with the liquid to be frozen.

What we claim is:

1. A freezing mould comprising a tray-like receptacle composed of a material having high thermal conductivity, and a plurality of containers also having high thermal conductivity disposed in said receptacle and secured in such relationship that the wall portions of respective containers are spaced from those of others and from the receptacle walls, the spaces between the containers having openings at the top and the receptacle being open at the top, for admission of fluid into the spaces about the containers.

2. A device as described in claim 1 and wherein the containers are secured to the bottom of the receptacle and have bottom portions spaced from bottom portions of the receptacle below them.

3. A device as specified in claim 1 and wherein the height of the receptacle walls exceeds the height of the container walls.

4. A device as specified in claim 1 and wherein the receptacle is provided with a drainage opening, which may be closed by a finger when the device is held in the hand, through which opening liquid may be drained from about the containers.

5. A device as specified in claim 1 and wherein the receptacle is provided with a drainage opening at the bottom, together with a stopper adapted to be unseated when the device is set on a plane surface.

6. A freezing mould comprising a sheet metal tray-like receptacle, and a plurality of sheet metal cup-like containers disposed in the receptacle in spaced relationship to one another and to the walls of the receptacle and affixed at their bottoms to the bottom of the receptacle, the receptacle affording a top opening for admission of fluid into the spaces about the containers, said receptacle affording also a bottom drainage opening through which liquid may be drained from said spaces.

In testimony whereof we have hereunto subscribed our names.

McDONALD LOVELL.
VICTOR SUSSIN.